US011993406B2

(12) United States Patent
Blais et al.

(10) Patent No.: US 11,993,406 B2
(45) Date of Patent: May 28, 2024

(54) DEVICE FOR ORIENTING A LOAD IN TWO ORTHOGONAL AXES OF ROTATION

(71) Applicant: AIRBUS DEFENCE AND SPACE SAS, Toulouse (FR)

(72) Inventors: Thierry Blais, Toulouse (FR); Alain Gossant, Toulouse (FR); Victor Pires, Flourens (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 167 days.

(21) Appl. No.: 17/787,209

(22) PCT Filed: Dec. 8, 2020

(86) PCT No.: PCT/EP2020/085004
§ 371 (c)(1),
(2) Date: Jun. 17, 2022

(87) PCT Pub. No.: WO2021/122137
PCT Pub. Date: Jun. 24, 2021

(65) Prior Publication Data
US 2023/0018576 A1    Jan. 19, 2023

(30) Foreign Application Priority Data
Dec. 18, 2019 (FR) ...................................... 1914747

(51) Int. Cl.
*B64G 1/66* (2006.01)
*H01Q 3/08* (2006.01)
(52) U.S. Cl.
CPC ................. *B64G 1/66* (2013.01); *H01Q 3/08* (2013.01)
(58) Field of Classification Search
CPC ...... B64G 1/66; B64G 1/22; B64G 2004/005; H01Q 1/1264; H01Q 3/08
See application file for complete search history.

(56) References Cited

U.S. PATENT DOCUMENTS 4,073,201 A * 2/1978 Taylor .................. B25J 17/0283
901/29
5,716,031 A * 2/1998 Duchon ................. B64G 1/244
244/164
(Continued)

FOREIGN PATENT DOCUMENTS

FR    2 367 578    5/1978
FR    2 704 515    11/1994
FR    2 903 751    1/2008

OTHER PUBLICATIONS

French International Search Report and Written Opinion of the ISA for PCT/EP2020/085004, 13 pages, dated Feb. 25, 2021.
(Continued)

*Primary Examiner* — Tye William Abell
(74) *Attorney, Agent, or Firm* — Nixon & Vanderhye P.C.

(57) ABSTRACT

A device for orienting a load about a main axis X and a secondary axis Y is disclosed having a first shaft, called transmission shaft, intended to support the load and configured to be rotated about the main axis and the secondary axis, a second shaft configured to be rotated about the main axis X, a third shaft configured to be rotated about a third axis of rotation, in the same direction as the main axis, a first connection component between the transmission shaft and the second shaft, configured to prevent relative movements between the transmission shaft and the second shaft in, on the one hand, a degree of rotational freedom about the main axis X and, on the other hand, three degrees of translational freedom.

11 Claims, 12 Drawing Sheets

(56) References Cited

U.S. PATENT DOCUMENTS 10,479,535 B2 * 11/2019 Ducarne .................. B64G 1/66
2017/0158357 A1 * 6/2017 Hart, III .................. B64G 1/66

OTHER PUBLICATIONS

English Translation of the International Search Report for PCT/EP2020/085004, 2 pages, dated Feb. 25, 2021.

* cited by examiner

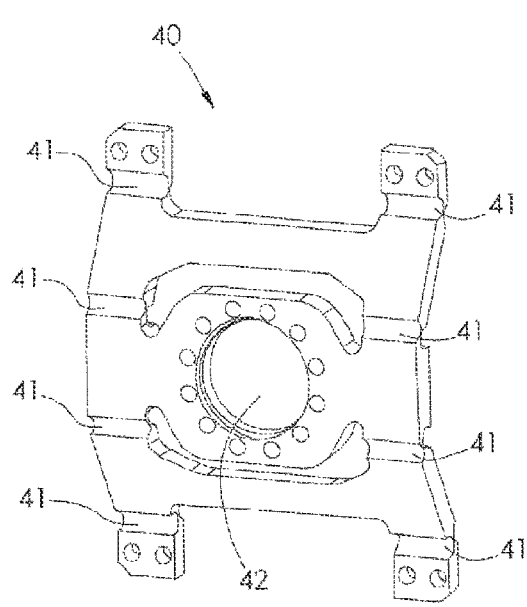 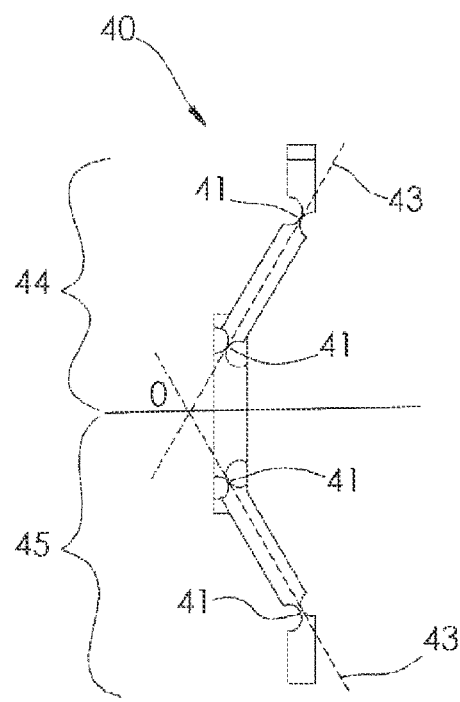
Fig. 3a　　　　　　　　　　　Fig. 3b
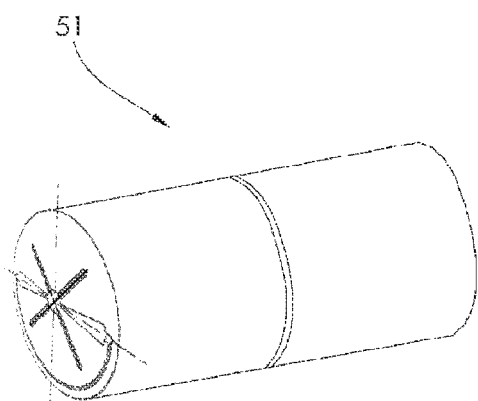 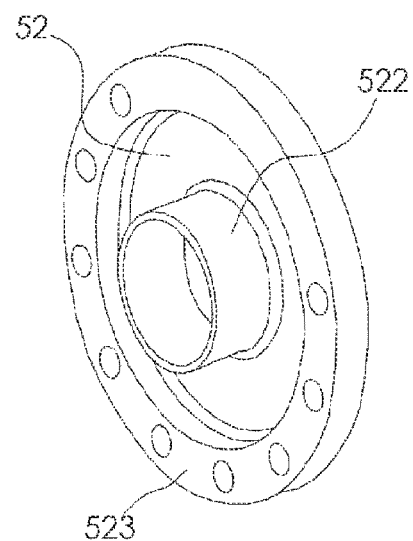
Fig. 4　　　　　　　　　　　Fig. 5

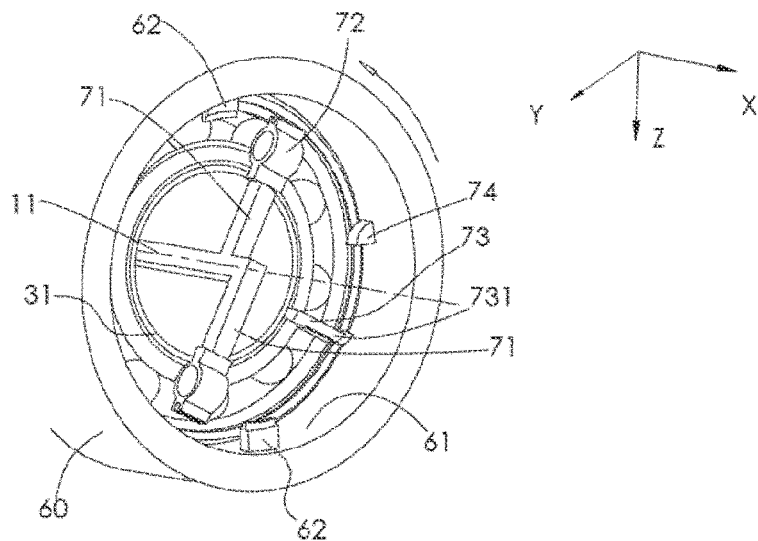
Fig. 12a
Fig. 12b
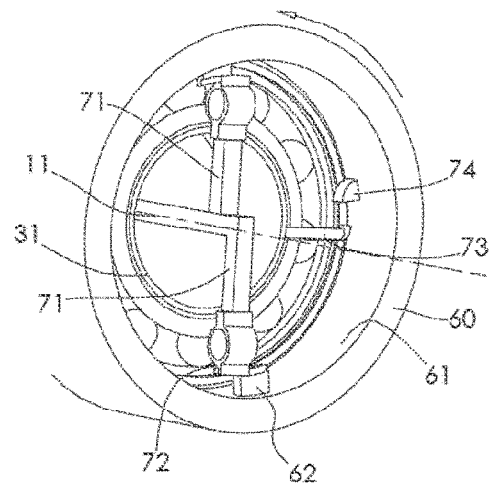
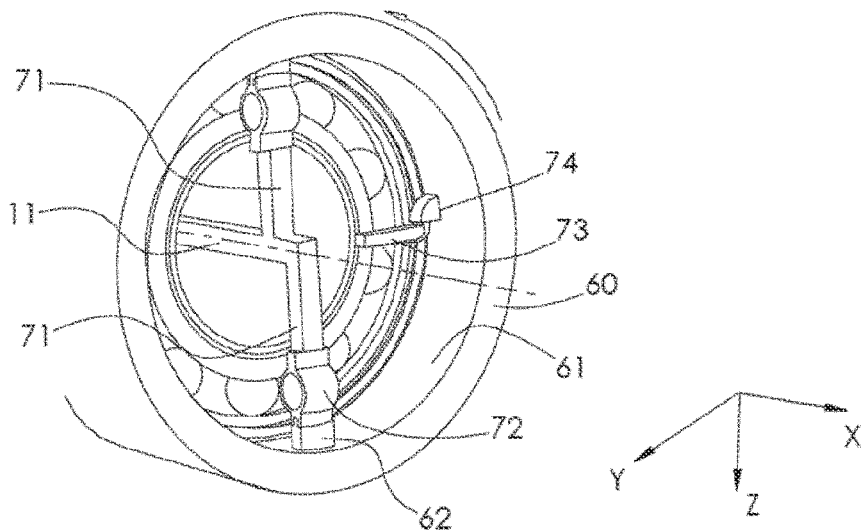
Fig. 12c

DEVICE FOR ORIENTING A LOAD IN TWO ORTHOGONAL AXES OF ROTATION

CROSS REFERENCE TO RELATED APPLICATIONS

The present application is a National Phase of International Application Number PCT/EP2020/085004 filed Dec. 8, 2020, which designated the U.S. and claims priority benefits from French Application Number FR1914747 filed Dec. 18, 2019, the entire contents of each of which are hereby incorporated by reference.

FIELD OF INVENTION

The present invention relates to a device for orienting a load allowing to orient said load in two orthogonal axes of rotation.

The present invention relates in particular to load orientation devices intended to be embedded in space vehicles such as those used in satellites, space probes.

PRIOR ART

In many fields, particularly those of aerospace and telecommunications, certain payloads used must be oriented with great precision, if possible in two orthogonal directions. These payloads are, for example, mirrors, radiofrequency reflectors. These payloads are generally associated with an orientation device designed to support and place them in a determined position.

To produce a device for orienting a load in two orthogonal axes of rotation, the existing architectures, known as series, are based on the stacking of two independent axes.

A first assembly is movable in rotation about a first axis of rotation, fixed relative to the carrier vehicle, and a second assembly, carrying the payload, is movable in rotation about a second axis of rotation. This second axis of rotation is carried by the first assembly and is orthogonal thereto. These two assemblies constitute what is commonly called a gimbal-type joint, and are each driven by an actuator. These serial architectures have many disadvantages. In particular, they involve heavy masses on board the first axis of rotation. These mobile masses generate strong mechanical stresses under the effect of gravity (whether for ground applications or space applications during ground tests) and even worse for satellite applications, under the effect of mechanical environments (launcher vibration). Operation under gravity, combined with centring defects—by design or by manufacture—involves parasitic torques disturbing the actuators, which may require oversizing of the actuators and gravity compensation means. This oversizing thus has a production cost and a size that is not negligible.

In addition, such serial architectures may prove to be not adapted for the sweeping magnitudes obtained on the two axes. Indeed, the serial architectures are designed to allow performing large sweeps on each of the two axes, which is not necessary for certain applications. In some cases, such as for example for the orientation of mirrors, only a large sweep (up to 360°) is necessary on the first axis of rotation and a small sweep (generally less than 10°) on the second axis of rotation.

DESCRIPTION OF THE INVENTION

The object of the present invention is to overcome these disadvantages.

The purpose of the invention is to propose a more efficient and robust architecture, in particular for space applications, compared to conventional architectures, to ensure two degrees of rotational mobility of a load.

To this end, the present invention proposes a device for orienting a load, with which is associated an orthonormal device reference frame XYZ, with centre 0. The orientation device is intended to orient said load about a longitudinal axis X, called main axis, and a transverse axis Y, called secondary axis. The orientation device includes:
- a first shaft, called transmission shaft, intended to support said load, configured to be rotated, at centre 0, about the main axis and the secondary axis,
- a second shaft, configured to be rotated about the main axis,
- a third shaft configured to be rotated about a third axis of rotation, in the same direction as the main axis X,
- a first connection component between the transmission shaft and the second shaft, configured to prevent relative movements between said transmission shaft and said second shaft in, on the one hand, a degree of rotational freedom about the main axis X and, on the other hand, three degrees of translational freedom,
- a second connection component between the transmission shaft and the third shaft and configured to allow relative movements between said transmission shaft and said third shaft in, on the one hand, a degree of translational freedom along the third axis of rotation and, on the other hand, three degrees of rotational freedom,
- the second connection component, the transmission shaft and the third shaft forming an eccentric kinematic connection.

The invention finds particular application in the space field, for the orientation of a payload along two perpendicular axes of rotation. This payload can be a mirror for optical instruments, an RF reflector for microwave sounder or RF antenna applications, or else a complete instrument.

This orientation device also finds other applications outside the space domain. The proposed architecture is particularly advantageous for non-isotropic kinematics, that is to say involving an axis with a large angular travel (infinite rotation capacity; spinning rotation) and a second axis with a smaller angular travel (a few degrees for tilting).

According to particular embodiments, the device according to the invention further meets the following features, implemented separately or in each of their technically effective combinations.

In preferred embodiments, the second shaft and the third shaft are hollow shafts through which the transmission shaft passes.

In preferred embodiments, the first connection component is a set of flexible elements.

In preferred embodiments, the second connection component includes a pivot, which is eccentric relative to the third axis of rotation of the third shaft, mounted on a membrane, said pivot being solidly attached to the transmission shaft and said membrane solidly attached to said third shaft.

The first connection component and the pivot of the second connection component are advantageously flexible components. This choice is justified by the small angles that the sweep must make (<±2° for the pivot and <±0.2° for the first connection component). It is very difficult to make small angles with ball bearings for a long lifespan (lubrication problems). In addition, this type of component improves orientation precision (no clearance and no friction).

In one embodiment, the third axis of rotation of the third shaft is distinct from the main axis X, the pivot of the second connection component being positioned on the main axis.

In another embodiment, the third axis of rotation of the third shaft coincides with the main axis X, the pivot of the second connection component being radially distant from said third axis of rotation.

In preferred embodiments, in the case where the third axis of rotation of the third shaft coincides with the main axis X, a second orthonormal reference frame X'Y'Z', with centre O, is associated with the second shaft. The three axes of the reference frame X'Y'Z' of this second reference frame coincide with the three axes XYZ of the device reference frame, when the orientation device is in the initial configuration. The orientation device includes an anti-rotation device configured to prevent the load from sweeping about the main axis X and the axis Y', and place the orientation device in a non-operational configuration, called blocked configuration. This blocked configuration is important when the orientation device is intended to be placed in a space vehicle. This configuration allows to protect the orientation device and its load, during a launch phase of said space vehicle.

In preferred exemplary embodiments, the anti-rotation device includes a first assembly configured to prevent the mirror from sweeping about the axis Y'.

In a preferred embodiment, the first assembly includes:
two arms, each extending radially from the transmission shaft towards an external frame of said orientation device, and each ending in a stop, the two arms being disposed in two distinct planes YZ,
two protrusions disposed on an internal face of the external frame, one protrusion in each plane YZ containing a radial arm.

The stops and protrusions are configured so that said stops cooperate, with a small clearance, with said protrusions of the external frame, when the orientation device is in the blocked configuration.

In preferred exemplary embodiments, in addition to the first assembly, the anti-rotation device includes a second assembly configured to prevent the mirror from sweeping about the main axis X.

In a preferred embodiment, the second assembly includes:
a flexible blade extending radially from the third shaft towards an external frame, including a ferromagnetic portion at a free end,
a magnetic element fixedly disposed on an internal face of the external frame.

The blade and the magnetic element are positioned in the orientation device in such a way that, when the stops cooperate with the protrusions of the first assembly, the blade bears against the magnetic element, placing the orientation device in the blocked configuration.

PRESENTATION OF THE FIGURES

The following description of the invention is made with reference to the figures, wherein identical references designate identical or similar elements, which show in a non-limiting manner:

FIG. 1 shows a sectional view, along a plane XY, of a first version of the load orientation device, in an initial configuration, FIG. 2 shows a sectional view, along a plane XY, of a second version of the load orientation device, in an initial configuration, FIG. 3a shows an example of a first connection component of the load orientation device, FIG. 3b shows a sectional view of the connection component of FIG. 3a, FIG. 4 shows an example of a pivot of a second connection component of the load orientation device, FIG. 5 shows an example of a membrane of a second connection component of the load orientation device, FIG. 6a shows a schematic representation of the first version of the load orientation device, in a plane XZ, in an initial configuration, FIG. 6b shows a schematic representation of the first version of the load orientation device, in a plane XZ, illustrating a rotation of the load about a main axis, FIG. 6c shows another schematic representation of the first version of the load orientation device, in a plane XZ, illustrating a rotation of the load about a main axis, FIG. 6d shows a schematic representation of the first version of the load orientation device, in a plane XZ, illustrating a rotation of the load about a secondary axis, FIG. 6e shows another schematic representation of the first version of the load orientation device, in a plane XZ, illustrating a rotation of the load about a secondary axis, FIG. 7a shows a schematic representation of the first version of the load orientation device, in a plane YZ, in an initial configuration, FIG. 7b shows a schematic representation of the first version of the load orientation device, in a plane YZ, illustrating a rotation of the load about a main axis, FIG. 7c shows another schematic representation of the first version of the load orientation device, in a plane YZ, illustrating a rotation of the load about a main axis, FIG. 7d shows a schematic representation of the first version of the load orientation device, in a plane YZ, illustrating a rotation of the load about a secondary axis, FIG. 7e shows a schematic representation of the first version of the load orientation device, in a plane YZ, illustrating a rotation of the load about a secondary axis, FIG. 8a shows a schematic representation of the second version of the load orientation device, in a plane XZ, in an initial configuration, FIG. 8b shows a schematic representation of the second version of the load orientation device, in a plane XZ, illustrating a rotation of the load about a main axis, FIG. 8c shows another schematic representation of the second version of the load orientation device, in a plane XZ, illustrating a rotation of the load about a main axis, FIG. 8d shows a schematic representation of the second version of the load orientation device, in a plane XZ, illustrating a rotation of the load about a secondary axis, FIG. 8e shows another schematic representation of the second version of the load orientation device, in a plane XZ, illustrating a rotation of the load about a secondary axis, FIG. 9a shows a schematic representation of the second version of the load orientation device, in a plane YZ, in an initial configuration, FIG. 9b shows a schematic representation of the second version of the load orientation device, in a plane YZ, illustrating a rotation of the load about a main axis, FIG. 9c shows another schematic representation of the second version of the load orientation device, in a plane YZ, illustrating a rotation of the load about a main axis, FIG. 9d shows a schematic representation of the second version of the load orientation device, in a plane YZ, illustrating a rotation of the load about a secondary axis, FIG. 9e shows another schematic representation of the second version of the load orientation device, in a plane YZ, illustrating a rotation of the load about a secondary axis, FIG. 10 shows a schematic representation of the second version of the load orientation device, in a plane XZ, in an initial configuration, and including an anti-rotation device, FIG. 11 shows a schematic representation of the second version of the load orientation device, in a plane XZ, in a blocked configuration, and including an anti-rotation device, FIG. 12a shows a schematic representation of the anti-rotation device illustrating its displacement towards the blocked configuration, FIG. 12b shows another schematic representation of the anti-rotation device illustrating its displacement towards the blocked configuration, FIG. 12c shows a schematic representation of the anti-rotation device in a blocked configuration.

DETAILED DESCRIPTION OF AN EMBODIMENT OF THE INVENTION

A device 100 for orienting a load according to the invention is preferably a dual-axis device, that is to say it is adapted and configured to orient (that is to say point) a load 10 mainly along two perpendicular axes of rotation.

The invention will be described below in the particular non-limiting context of one of its preferred fields of application wherein the device 100 for orienting a load is intended to be used in a space vehicle, of the satellite type.

The invention will be more particularly described in a non-limiting embodiment wherein the load is a payload such as a mirror 10.

FIGS. 1 and 2 schematically illustrate two versions of an orientation device 100. In the remainder of the description, regardless of the version of the orientation device 100, said orientation device is associated with a device reference frame including three axes XYZ orthogonal to each other, and with centre 0.

The device reference frame is connected to the orientation device, that is to say it is entirely defined by the geometry of said orientation device.

The device reference frame includes:
a longitudinal axis, called main axis X,
a transverse axis, called secondary axis Y, perpendicular to the main axis,
a third axis, called tertiary axis Z, perpendicular to the two previous axes.

The orientation device 100 is advantageously configured to orient the mirror 10 along the main axis X and the secondary axis Y. The tertiary axis is considered non-functional.

In the preferred example where the load is a mirror 10, the rotation of the mirror about the main axis X is advantageously used to select a scene to be analysed, by carrying out a sweep of the earth. The rotation of the mirror 10 about the secondary axis Y is in turn advantageously used to direct the mirror in order to compensate for the speed of the space vehicle.

Figure 1:
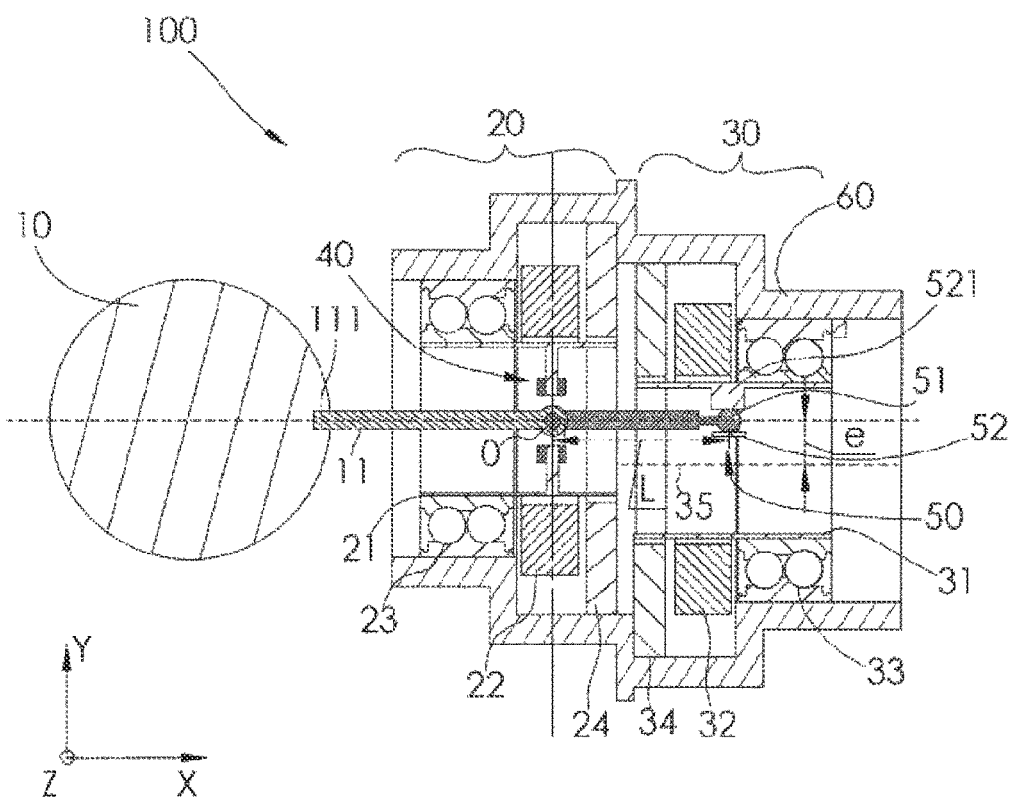
FIGS. 1 and 2 show the orientation device in a plane XY, that is to say a plane formed by the axes X and Y of the device reference frame, in a configuration called initial configuration.
Figure 2:
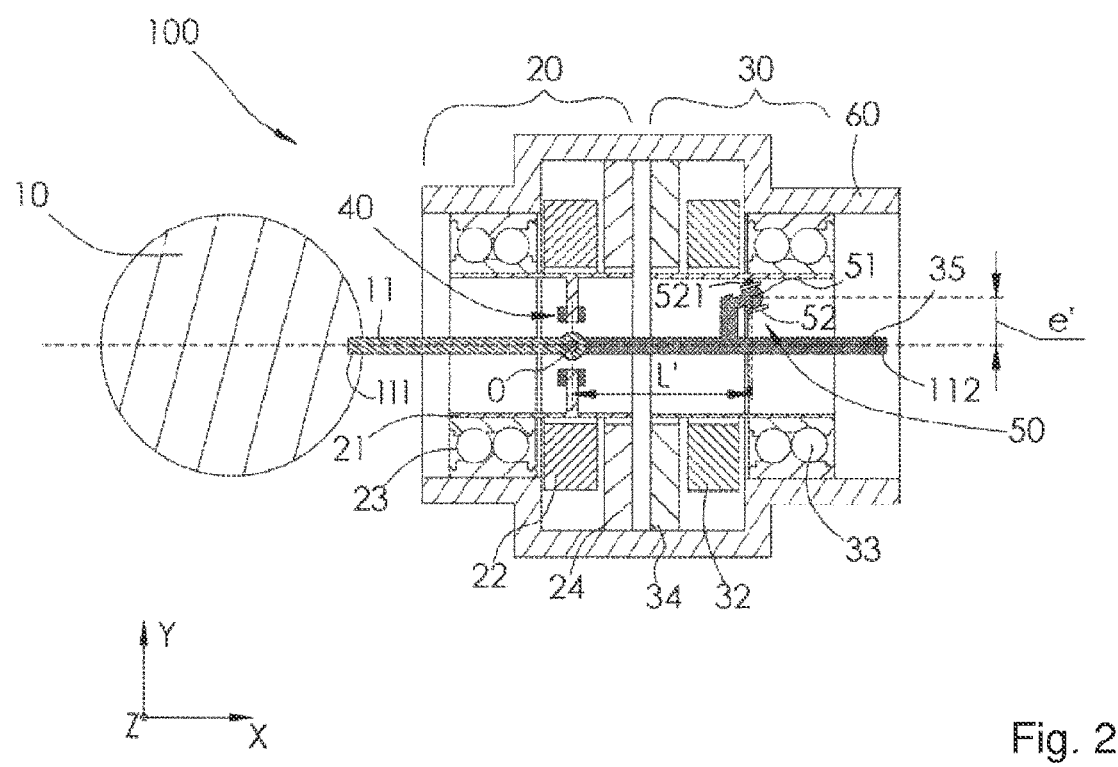

The orientation device 100 firstly includes a first shaft, called transmission shaft 11, intended and configured to support the mirror 10, as illustrated in FIGS. 1 and 2.

The mirror 10 is preferably disposed at a first end of the transmission shaft 11. The transmission shaft 11 has as axis of rotation, an axis called the first axis of rotation. The transmission shaft 11 thus extends along the main axis X. In an initial configuration, the first axis of rotation coincides with the main axis X.

The transmission shaft 11 is configured to be rotated, at the centre 0, about the main axis X and about the secondary axis Y.

The orientation device 100 further includes a second shaft 21.

Said second shaft 21 forms the rotor of a first electric motor of a first motorisation assembly 20.

Said second shaft 21 is preferably a hollow shaft through which passes the transmission shaft 11.

The second shaft 21 has as its axis of rotation, an axis called the second axis of rotation, coinciding with the main axis X. Said second shaft thus extends along the main axis X.

The second shaft 21 is configured to be rotated only about the main axis X.

The first motorisation assembly 20 further includes:
a stator 22 forming the fixed portion of the first electric motor,
ball bearings 23 arranged to guide the rotor 21 and to withstand the launch environment,
an angular position sensor 24 arranged and configured to measure the actual angular position of the rotor 21, that is to say of the second shaft 21, relative to the stator 22 and to use it preferably in a feedback loop to control this position.

In a preferred embodiment, the angular position sensor 24 of the first motorisation assembly 20 is an optical encoder.

The movements of the second shaft 21 are created, guided and controlled by the first electric motor, the ball bearings 23 and the angular position sensor 24.

In an exemplary embodiment, the first electric motor is a brushless DC motor.

The transmission shaft 11 and the second shaft 21 are connected to each other by a first connection component 40.

The first connection component 40 is advantageously placed at the centre 0 of the device reference frame.

Said first connection component is configured to prevent relative movements between said transmission shaft and said second shaft, preferably only, according to:
a degree of rotational freedom about the main axis X,
three degrees of translational freedom.

In other words, the first connection component 40:
blocks the rotation between the transmission shaft 11 and the second shaft 21 about the main axis X,
blocks the translations between the transmission shaft 11 and the second shaft 21 along the main axis X, the secondary axis Y and the tertiary axis Z,
authorises rotations between the transmission shaft 11 and the second shaft 21 about the secondary axis Y and that about the tertiary axis Z.

In other words, the first connection component 40 connects together the transmission shaft 11 and the second shaft 21 in translation along the three axes (main axis, secondary axis and tertiary axis). It connects them in rotation about the main axis X. It leaves free only the rotations between the transmission shaft 11 and the second shaft 21 about the secondary axis Y and the tertiary axis Z. The first connection component 40 is equivalent to a mechanical connection commonly referred to as a ball-and-socket joint.

In an exemplary embodiment, the first connection component 40 is a set of flexible elements.

The first connection component 40 is calculated in material, shape and dimensions so as to release the two rotations about the secondary Y and tertiary Z axis on the respective travels required by the application, while blocking the other 4 degrees of freedom (the three translations along and one rotation about the main axis X).

The optimum geometry of the first connection component 40 is to be determined according to the needs and constraints specific to each application.

In one embodiment, the first connection component 40 is made as a monolithic part including four thinned sections. Each thinned section forms a base pivot.

In a preferred embodiment, illustrated in FIG. 3a, for reasons of manufacturing constraints, the first connection component 40 includes eight thinned sections 41. These eight thinned sections are preferably disposed in two rows of four thinned sections.

The first connection component 40 includes a central opening 42 sized to receive the transmission shaft 11.

An axis of rotation of the first connection component 40 corresponds to the straight line passing through the intersections of straight planes 43 passing through the centres of the same row of base pivots 41 of the upper 44 and lower 45 portions of the first connection component 40, when said first connection component is in the rest configuration, as illustrated in FIG. 3b.

The first connection component 40 has an offset centre of rotation. The centre of rotation corresponds to the intersection of the axis of rotation of the first connection component 40 and the main axis X.

The first connection component 40 is advantageously positioned in the orientation device 100 such that its centre of rotation is positioned at the centre 0 of the device reference frame.

The first connection component 40 is advantageously made of a titanium-based alloy material, such as for example TA6V.

The orientation device 100 further includes a third shaft 31.

Said third shaft 31 forms the rotor of a second electric motor of a second motorisation assembly 30.

Said third shaft 31 is preferably a hollow shaft through which passes the transmission shaft 11.

The third shaft 31 has as its axis of rotation, an axis called the third axis of rotation 35, in the same direction as the main axis X. Said third shaft extends along said third axis of rotation 35.

The third shaft 31 is configured to be only rotated about said third axis of rotation 35.

The second motorisation assembly 30 further includes:
- a stator 32 forming the fixed portion of the second electric motor,
- ball bearings 33 arranged to guide the rotor 31 and to withstand the launch environment,
- an angular position sensor 34 arranged and configured to measure the actual angular position of the rotor 32, that is to say of the third shaft 31, relative to the stator 32 and to use it preferably in a feedback loop to control this position.

In a preferred exemplary embodiment, the angular position sensor 34 of the second motorisation assembly 30 is an optical encoder.

The movements of the third shaft 31 are created, guided and controlled by the second electric motor, the ball bearings 33 and the angular position sensor 34. In an exemplary embodiment, the second electric motor is a brushless DC motor.

Preferably, the first motorisation assembly 20 and the second motorisation assembly 30 are identical.

The first motorisation assembly 20 is arranged between the mirror 10 and the second motorisation assembly 30.

The transmission shaft 11 and the third shaft 31 are connected to each other by a second connection component 50.

The second connection component 50, the transmission shaft 11 and the third shaft 31 are arranged together so as to form an eccentric kinematic connection. Said second connection component is configured to allow relative movements between said transmission shaft and said third shaft, preferably only, according to:
- a degree of translational freedom along the third axis of rotation,
- three degrees of rotational freedom.

The function of the second connection component 50 is to convert a difference in angles between the second shaft 21 and the third shaft 31 into a linear displacement of the first end of the transmission shaft 11 without transmitting rotation.

The second connection component 50 is equivalent to a mechanical connection commonly referred to as an annular linear connection or sphere/cylinder connection.

In an exemplary embodiment, the second connection component 50 includes a pivot 51, which is eccentric relative to the third axis of rotation 35 of the third shaft 31, mounted on a membrane 52. The pivot 51 and the membrane 52 are of adapted shape to create an annular linear connection.

The pivot 51 is on the one hand solidly attached to the transmission shaft 11. The pivot 51 is on the other hand attached to the membrane 52. The membrane 52 is in turn solidly attached to the third rotation shaft 31. Preferably, the membrane 52 is solidly attached to the third shaft 31, via an arm 521, as illustrated in FIGS. 1 and 2.

The term "attached" is understood to mean when it refers to parts relative to each other in a manner which is conventional per se, that said parts are mutually connected, a relative movement between them however being possible. In the present description, conventionally, the term "attached" will designate parts being connected to each other by a connection allowing relative movement of one part relative to the other. The term "solidly attached" will denote parts which are mutually connected in a fixed manner, that is to say in such a way that relative movement between them is impossible.

Preferably, the pivot 51 has an axis of rotation oriented towards the centre of rotation of the first connection component 40, and therefore the centre 0 of the device reference frame, to reduce parasitic movements and forces.

In an exemplary embodiment of the pivot, as illustrated in FIG. 4, said pivot is a pivot with flexible blades of a type known per se.

In one embodiment, said pivot is a pivot with crossed blades, that is to say composed of blades having the same total working length and placed orthogonally. These blades connect two blocks that can move relative to each other. The pivot forms a rotating joint and its axis of revolution is the intersection of the two blades in the rest configuration. The pivot has a cylindrical external overall shape.

The pivot is calculated in material, shape and dimensions so as to:
reduce operating constraints to increase its lifespan,
reduce torsional rigidity,
maximise resistance to buckling.

The membrane 52 advantageously has a thermomechanical function.

The membrane 52 is a flexible part advantageously used to compensate for thermomechanical displacements. The deformation of the membrane 52 advantageously allows any residual parasitic displacement.

The membrane 52 contributes to the modal behaviour of the orientation device. The membrane 52 is advantageously disposed at the median plane of the pivot 51 in order to be aligned with a centre of the pivot 51. This configuration also has the advantage of being more tolerant of geometric defects.

FIG. 5 shows a typical example of membrane 52. The membrane 52 is represented by the thinned portion. It is comprised between a first rigid, hollow cylindrical internal interface 522, which receives the pivot 51, and a second rigid external interface 523, configured to be fixed to the third shaft 31, preferably via the arm 521.

The membrane 52 is advantageously made of a material replicating the thermomechanical behaviour of the pivot.

In a first version of the orientation device 100, as illustrated in FIG. 1, the third axis of rotation 35 of the third shaft 31 is distinctly parallel to the main axis X. The eccentric pivot 51 is positioned at the main axis X.

In a second version of the orientation device 100, as illustrated in FIG. 2, the third axis of rotation 35 of the third shaft 31 is colinear with the main axis X. The eccentric pivot 51 is radially distant from the third axis of rotation 35 of the third shaft 31, therefore from the main axis X.

The orientation device 100 further includes a common external frame 60 grouping together all the elements constituting the first motorisation assembly 20, the second motorisation assembly 30 and the transmission shaft 11.

The orientation device 100 as defined by the invention is adapted to orient the mirror 10 mainly along the main axis X and the secondary axis Y.

The way of orienting the mirror 10 by the orientation device 100 along the main X and secondary Y axes differs according to the version of the orientation device.

Operation of the First Version of the Orientation Device

To orient the mirror along the main axes X and Y, the orientation device 100, in its first version, is adapted to sweep the mirror 10 mainly about the main axis X and the secondary axis Y.

Preferably, the orientation device 100 is configured to carry out a large sweep of the mirror about the main axis X and a small sweep of the mirror about the secondary axis Y.

Large sweep means a rotation over an angular range up to 360°.

Small sweep means a rotation over a maximum angular range of 5°.

To perform these sweeps, the orientation device 100 is dimensioned based on two parameters:
a distance L between the centre of the first connection component 40, therefore the centre 0, and the centre of the pivot 52 of the second connection component 50,
a minimum distance e between the centre of the pivot 52 of the second connection component 50 and the third axis of rotation 35.

The choice of the dimensioning of the distances L and e defines the reduction ratio between the rotation of the third shaft 31 and the induced rotation of the mirror 10 about the secondary axis Y, in other words the sweeping about the secondary axis Y.

In an exemplary embodiment, to ensure a maximum sweeping of the mirror 10 of 4.5° about the secondary axis Y, L and e take the following values:
L=231.356 mm,
e=18.172 mm.

The person skilled in the art will be able to adapt the dimensions to the sweeping sought.

FIGS. 6a to 7e are very schematic non-limiting representations of the first version of the orientation device 100, where only are presented:
the mirror 10,
the transmission shaft 11, shown in the non-limiting form of a square section bar,
the second shaft 21, shown in the non-limiting form of a hollow cylinder of circular section,
the third shaft 31, shown in the non-limiting form of a hollow cylinder of circular section,
the first connection component 40,
the second connection component 50.

FIGS. 6a to 6e are views in the plane XZ of the orientation device 100. In these FIGS. 6a to 6e, the second shaft 21 and the third shaft 31 are represented in transparency, in order to visualise the first connection component 40 and the second connection component 50 and their displacement.

FIGS. 7a to 7e are views in the plane YZ of the orientation device 10. It is clearly visible in these figures that the second shaft 21 and the third shaft 31 are offset in the plane YZ.

Figure 6A:
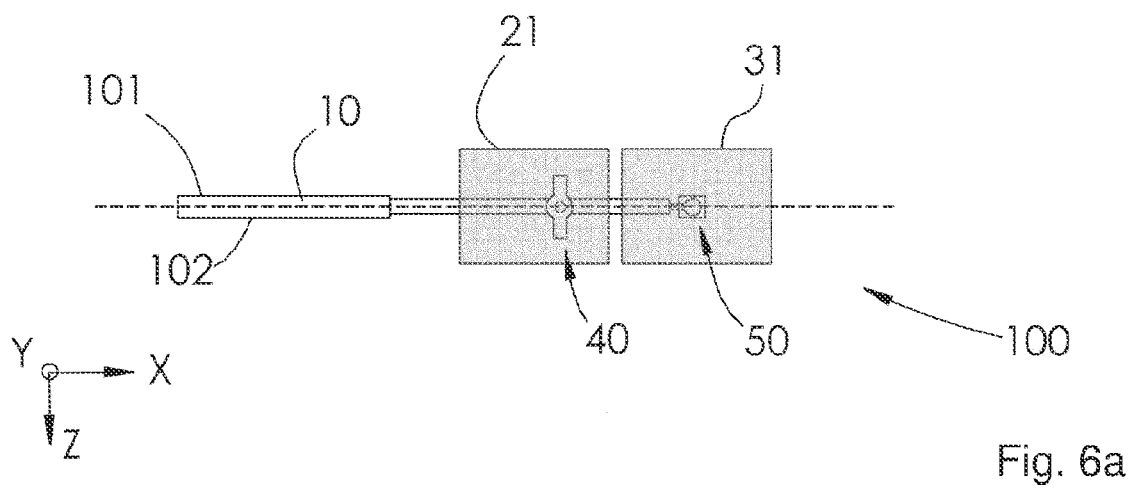
FIGS. 6a-6e, 8a-8e show the orientation device in a plane XZ, that is to say a plane formed by the axes X and Z of the device reference frame.
Figure 6B:
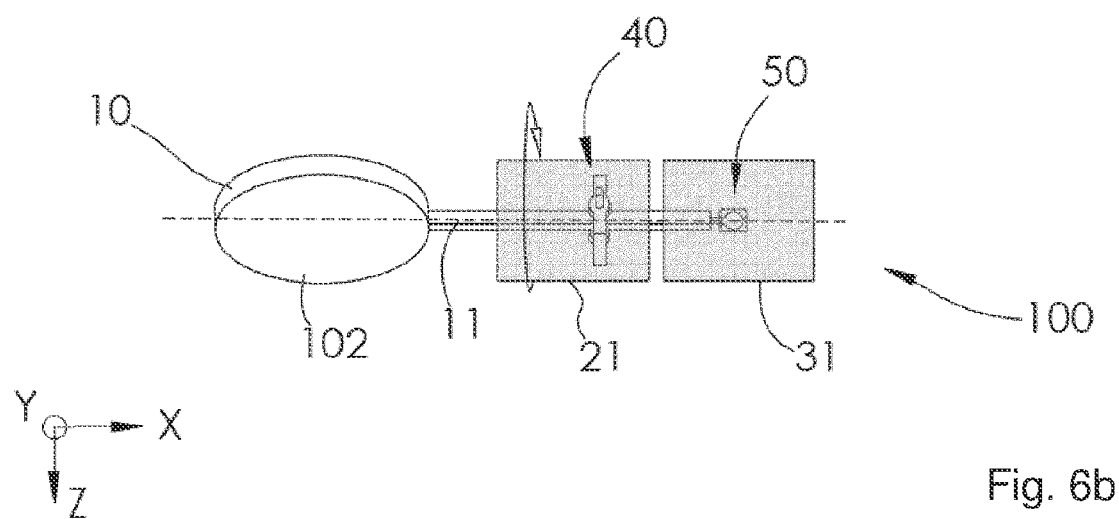
Figure 6C:
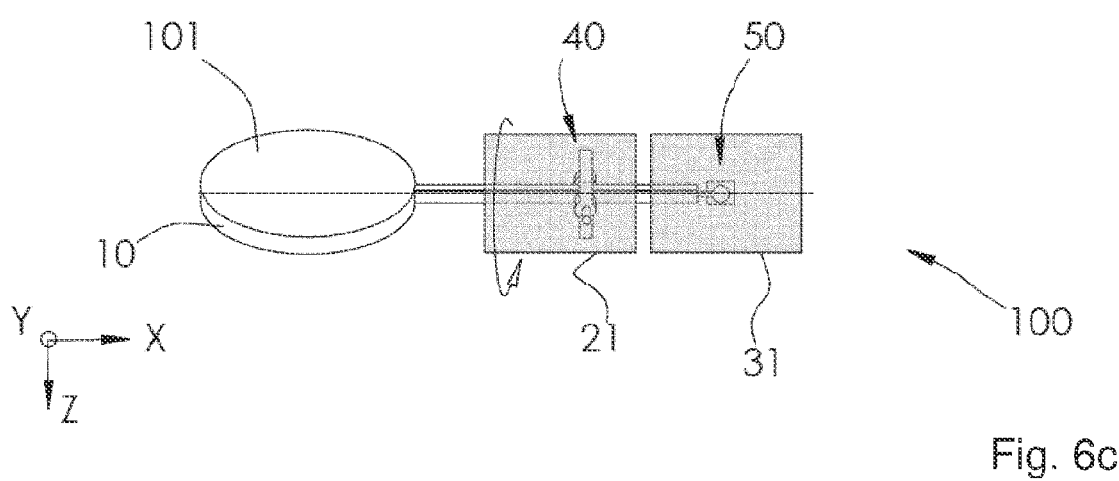
Figure 6D:
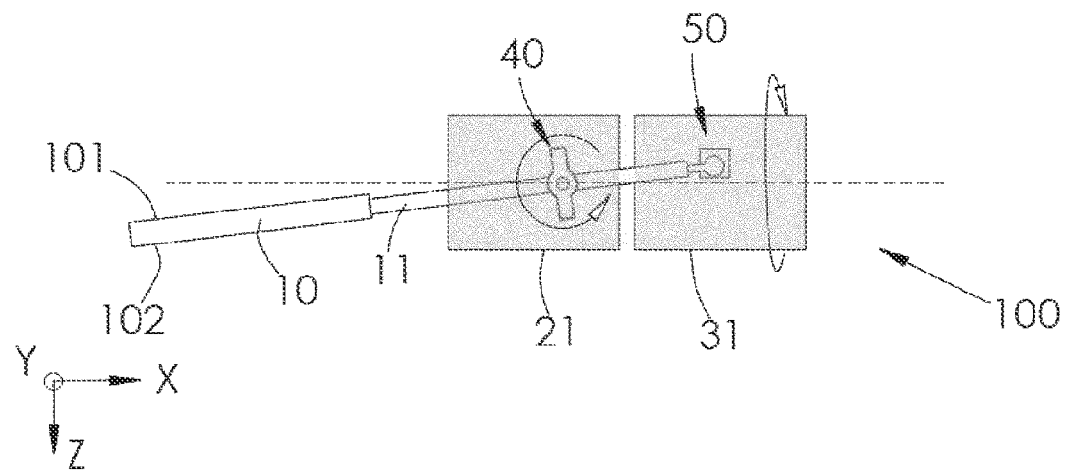
Figure 6E:
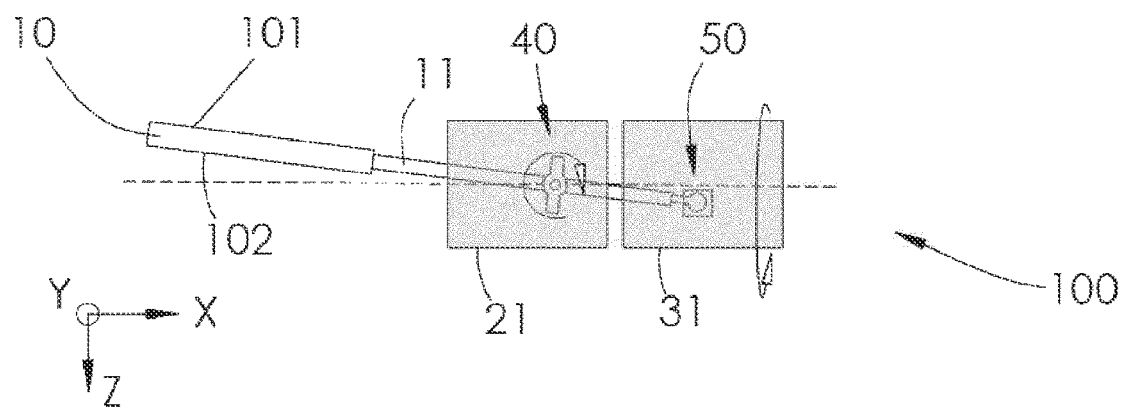
Figure 7A:
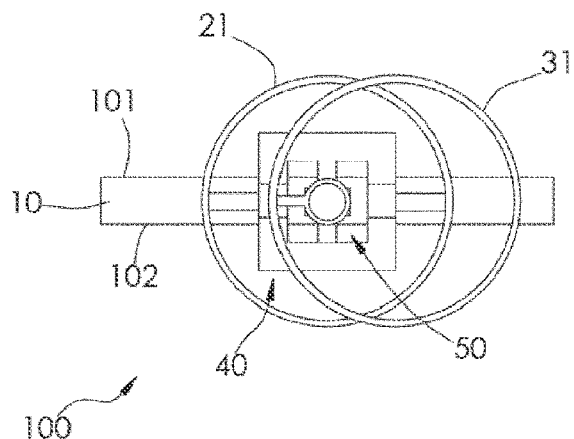
FIGS. 7a-7e, 9a-9e show the orientation device in a plane YZ, that is to say a plane formed by the axes Y and Z of the device reference frame.

In the initial configuration, illustrated in FIGS. 6a and 7a, the mirror 10 has faces 101, 102 parallel to the plane XY of the device reference frame. The face 101 corresponds to the reflective face and the face 102 corresponds to the back of the mirror.

To perform a rotation of the mirror 10 about the main axis X, only the second shaft 21 is rotated about the main axis X. The third shaft 31 is blocked in rotation about its third axis of rotation 35.

Figure 7B:
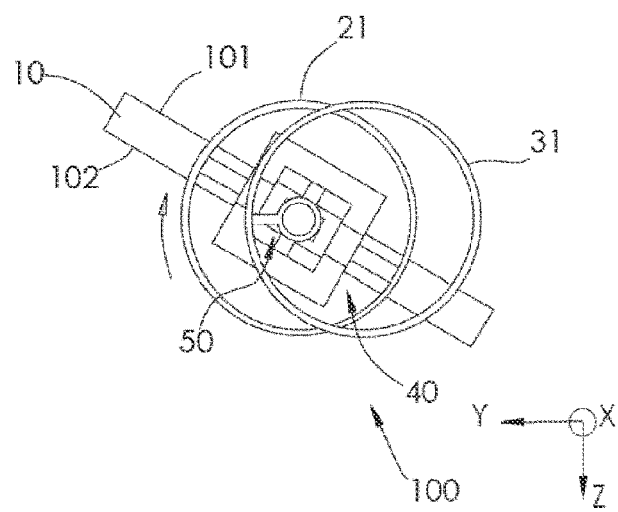
Figure 7C:
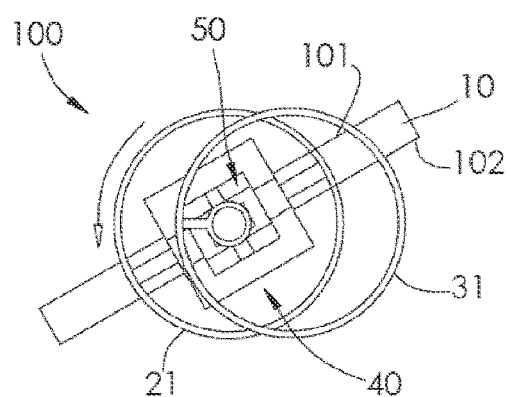

FIGS. 7b and 7c show that the third shaft 31 has remained in a stationary position, the positioning of the second connection component 50 having not changed in the plane YZ relative to its position in FIG. 7a. FIG. 7b, respectively FIG. 7c, also shows that the second shaft 21 has performed a rotation about the main axis X in a clockwise direction (to the right in FIG. 7b), respectively in a counter-clockwise direction (to the left in FIG. 7c).

The first connection component 40 connects in rotation about the main axis X the second shaft 21 with the transmission shaft 11. Thus, the rotation of the second shaft 21 about the main axis X causes an identical rotation of the first connection component 40 about the main axis X, and following a rotation of the transmission shaft 11 also about the main axis X, as illustrated in FIGS. 6b, 6c, 7b and 7c.

The mirror 10 being connected to the transmission shaft 11, a rotation of said transmission shaft 11 about the main axis X automatically generates a rotation of the mirror 10 about the main axis X.

The mirror 10 can thus advantageously perform a complete rotation about the main axis X, that is to say a rotation of 360°.

To obtain a rotation of the mirror 10 about the secondary axis Y, only the third shaft 31 is rotated about its third axis of rotation 35. The second shaft 21 is in turn blocked in rotation about the main axis X.

Figure 7D:
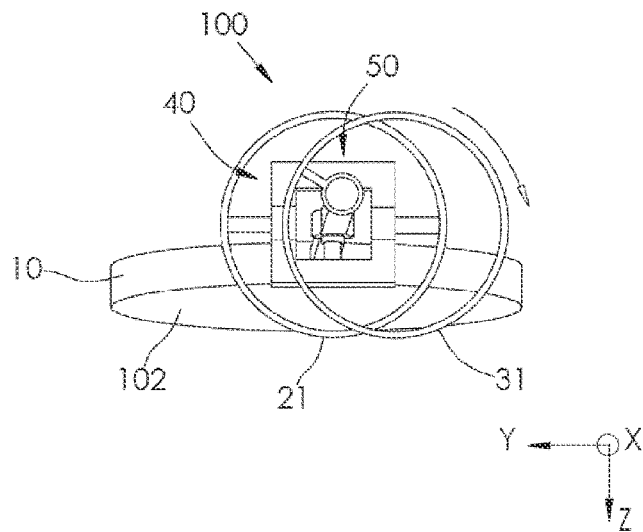
Figure 7E:
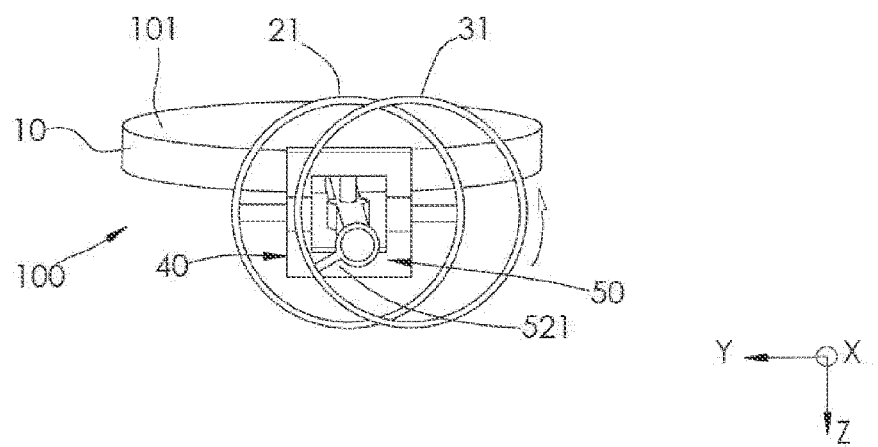

FIGS. 7d and 7e show that the second shaft 21 has remained in a stationary position, the positioning of the first connection component 40 having not changed in the plane YZ relative to its position in FIG. 7a. FIG. 7d, respectively FIG. 7e, also shows that the third shaft 31 has performed a rotation about the third axis of rotation 35, in the clockwise direction (to the right in FIG. 7d), respectively in the counter-clockwise direction (to the left in FIG. 7e).

A rotation of the third shaft 31 about its third axis of rotation 35 causes a rotation of the second connection component 50 only about the third axis of rotation 35. The transmission shaft 11 is solidly attached to the pivot 51 of the second connection component 50. By performing a rotation of the third shaft 31 about the third axis of rotation 35, the rotation of the pivot 51 of the second connection component 50 can be assimilated to a displacement along the tertiary axis Z. This movement causes a rotation of the transmission shaft 11 about the secondary axis Y, via the first connection component 40.

The mirror 10 being connected to the transmission shaft 11, a rotation of said transmission shaft about the secondary axis Y automatically generates a rotation of the mirror 10 about said secondary axis.

The rotation of the second connection component 50 about the third axis of rotation 35 also causes a slight non-functional rotation about the tertiary axis Z.

Operation of the Second Version of the Orientation Device

For this second version of the orientation device, another orthonormal reference frame is associated with said orientation device, in addition to the device reference frame. This other reference frame, called the second reference frame, is a reference frame attached to the second shaft 21. This second reference frame comprises three axes X'Y'Z' that are orthogonal to one another. The second reference frame has the same centre 0 as the device reference frame. The three axes X'Y'Z' of this second reference frame coincide with the three axes XYZ of the device reference frame, in the initial configuration (that is to say as shown in FIG. 2). The three axes X'Y'Z' of this second reference frame are shown in FIGS. 9b and 9c, as well as the three axes XYZ of the device reference frame, when the orientation device is not in the initial configuration.

To orient the mirror along the main axes X and Y, the orientation device 100, in its second version, is suitable for sweeping the mirror 10 mainly about the main axis X and the axis Y'.

Preferably, the orientation device 100 is configured to carry out a large sweep of the mirror about the main axis X and a small sweep of the mirror about the axis Y'.

Large sweep means a rotation over an angular range up to 360°.

Small sweep means a rotation over a maximum angular range of 5°.

To perform these sweeps, the orientation device 100 is dimensioned based on two parameters:
- a distance L' between the centre of the first connection component 40, therefore the centre 0, and the projection on the main axis X of the centre of the pivot 52 of the second connection component 50,
- a minimum distance e' between the centre of the pivot 52 of the second connection component 50 and the third axis of rotation 35.

The choice of the dimensioning of the distances L' and e' defines the reduction ratio between the rotation of the third shaft 31 and the induced rotation of the mirror 10 about the axis Y', in other words the sweeping about the axis Y'.

In an exemplary embodiment, to ensure a maximum sweeping of the mirror 10 of 4.5° about the axis Y', L' and e' take the following values:

L'=231.356 mm,
e'=18.172 mm.

The person skilled in the art will be able to adapt the dimensions to the sweep sought.

As with FIGS. 6a to 7e, FIGS. 8a to 9e are very schematic non-limiting representations of the second version of the orientation device 100, with the same elements shown as those in FIGS. 6a to 7e.

FIGS. 8a to 8e are views in the plane XZ of the orientation device 100. In these FIGS. 8a to 8e, the second shaft 21 and the third shaft 31 are shown in transparency, in order to view the first connection component 40 and the second connection component 50 and their displacement.

FIGS. 9a to 9e are views in the plane YZ of the orientation device 100. It is clearly visible in these figures that the second shaft 21 and the third shaft 31 have the same axis of rotation as the main axis X.

Figure 8A:
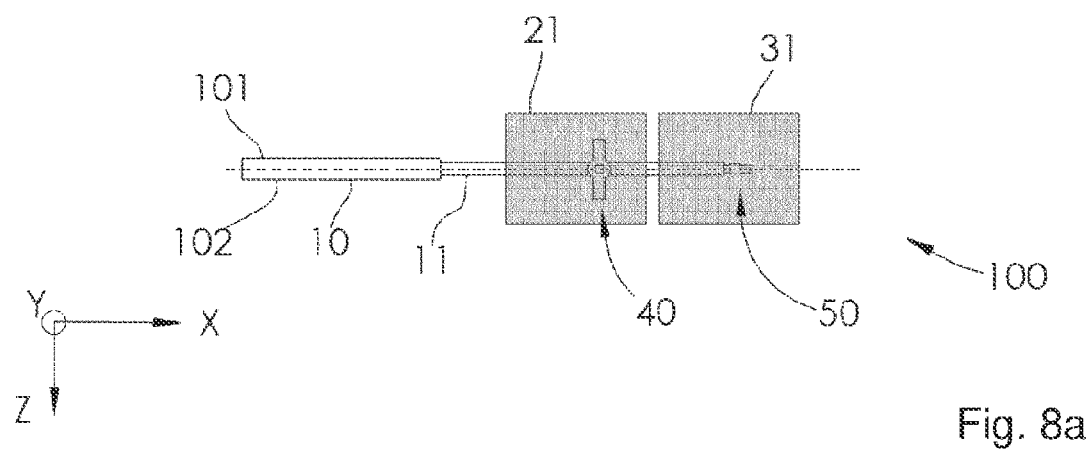
Figure 8B:
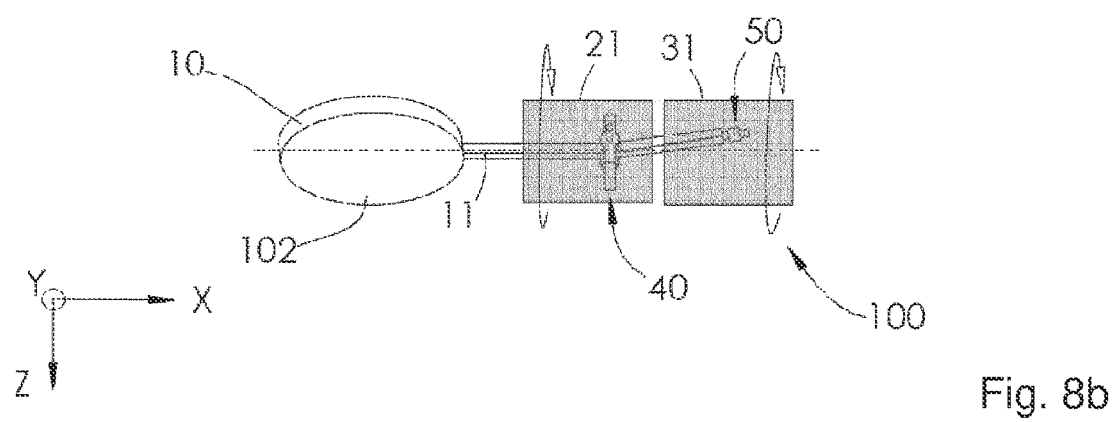
Figure 8C:
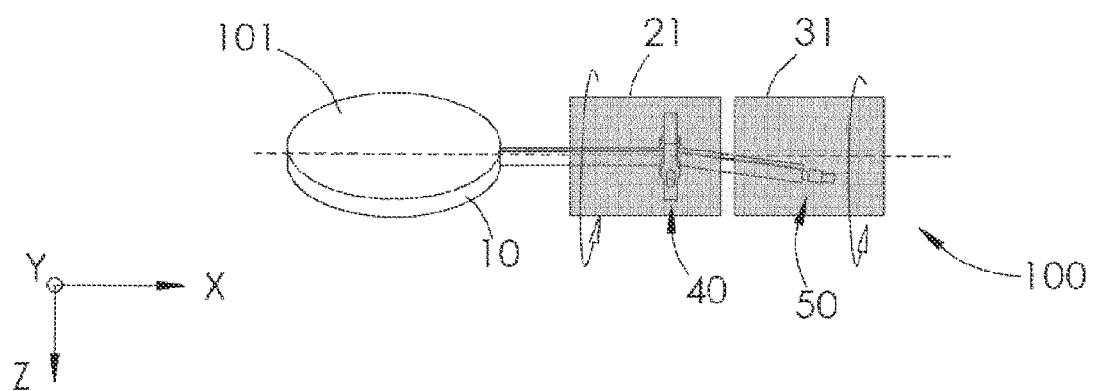
Figure 8D:
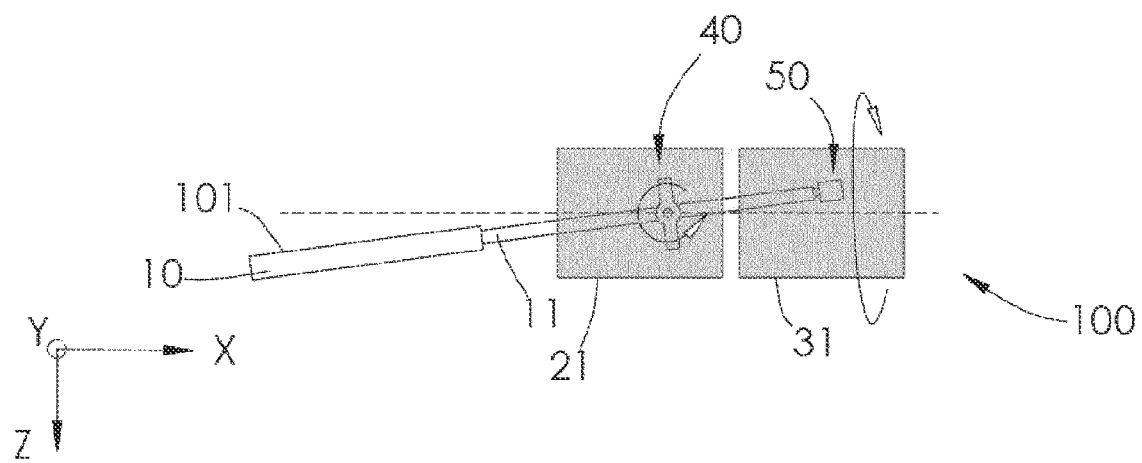
Figure 8E:
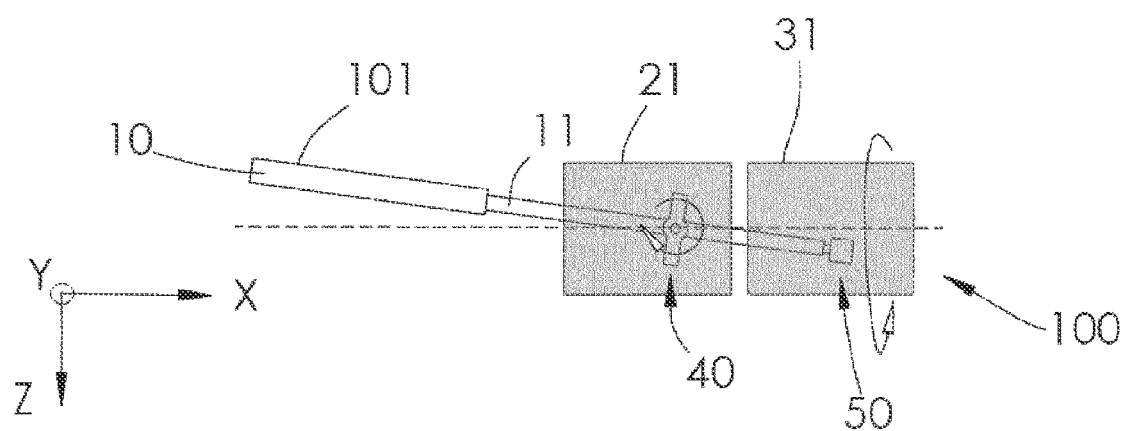
Figure 9A:
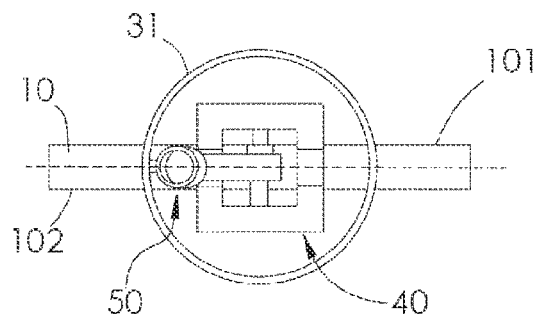
Figure 9A:
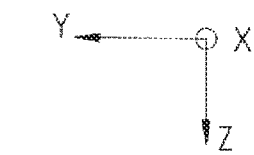
Figure 9B:
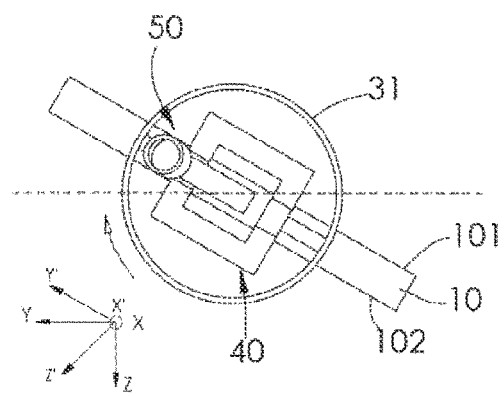
Figure 9C:
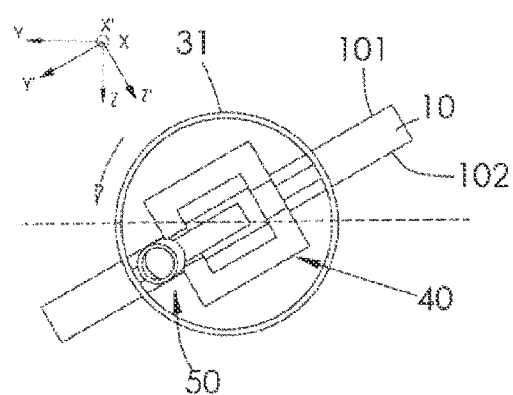

FIGS. 8a and 9a illustrate the positioning of the mirror 10 in the initial configuration, identically to FIGS. 6a and 7a.

To perform a rotation of the mirror 10 about the main axis X, the second shaft 21 and the third shaft 31 are simultaneously rotated about said main axis X.

FIGS. 9b and 9c show that the second and third shafts 21, 31 have performed a synchronised rotation of the same amplitude, the positioning of the first and second connection components 40, 50 having changed relative to their position in FIG. 9a. FIG. 9b, respectively FIG. 9c, also shows that the second and third shafts 21, 31 have performed a synchronised rotation of the same amplitude about the main axis X in a clockwise direction, respectively in a counter-clockwise direction (to the right on FIG. 9b, respectively to the left in FIG. 9c). A synchronised rotation of the second and third shafts 21, 31 about the main axis X causes a synchronised rotation of the second and third connection components 40, 50 about the main axis X. The transmission shaft 11 is solidly attached to the connection component 40 and the pivot 51 of the second connection component 50, thus the synchronised rotation also causes a rotation of the transmission shaft 11 about the main axis X, as illustrated in FIGS. 8b, 8c, 9b and 9c.

To obtain a rotation of the mirror 10 about the axis Y', only the third shaft 31 is rotated about its third axis of rotation 35. The second shaft 21 is in turn blocked in rotation about the main axis X.

Figure 9D:
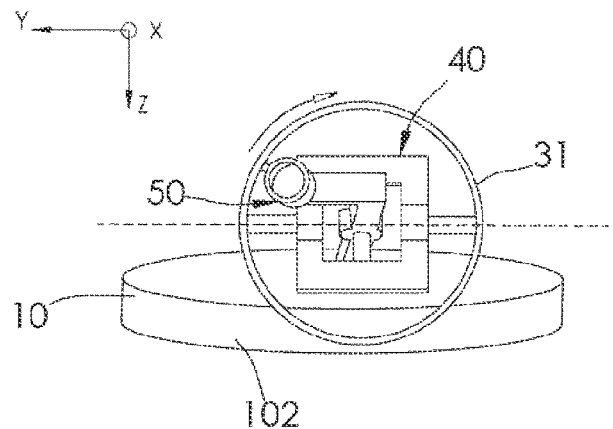
Figure 9E:
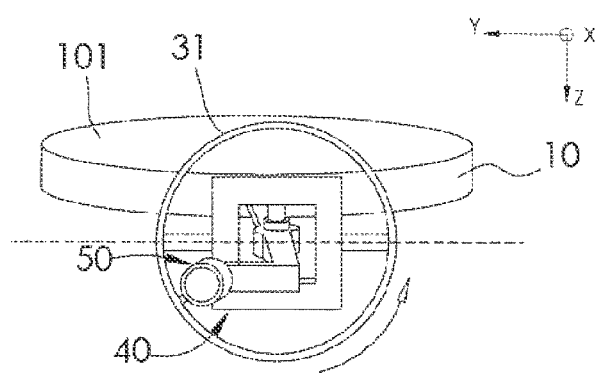

FIGS. 9d and 9e show that the second shaft 21 has remained in a stationary position, the positioning of the first connection component 40 having not changed in the plane YZ relative to its position in FIG. 9a. FIG. 9d, respectively FIG. 9e, also shows that the third shaft 31 has performed a rotation about the main axis X in the clockwise direction, respectively in the counter-clockwise direction (to the right in FIG. 9d, respectively to the left in FIG. 9e).

A rotation of the third shaft 31 about the main axis X causes a rotation of the second connection component 50 only about the main axis X. The transmission shaft 11 is solidly attached to the pivot 51 of the second connection component 50. By performing a rotation of the third shaft 31 about the main axis X, the rotation of the pivot 51 of the second connection component 50 can be assimilated to a displacement along an axis parallel to the tertiary axis Z. This displacement causes a rotation of the transmission shaft 11 about the axis Y', via the first connection component 40.

The mirror 10 being connected to the transmission shaft 11, a rotation of said transmission shaft about the axis Y' automatically generates rotation of the mirror 10 about said axis Y'.

The rotation of the second connection component 50 about the third axis of rotation 35 also causes a slight non-functional rotation about the tertiary axis Z. In an improved embodiment of the second version of the orientation device 100, said orientation device includes an anti-rotation device 70.

Indeed, during the launch of a space vehicle including an orientation device 100, the mechanical environment creates very strong stresses on said orientation device. The movements of the mirror 10 must also be limited in order to:
- guarantee that the mirror 10 remains in a position called safety or blocked position during launch with a certain precision;
- avoid shocks.

The anti-rotation device 70 is preferably disposed at a second end 112 of the transmission shaft 11, opposite the first end 111 where the mirror 10 is fixed, as illustrated in FIGS. 2 and 10 to 12c.

Figure 10:
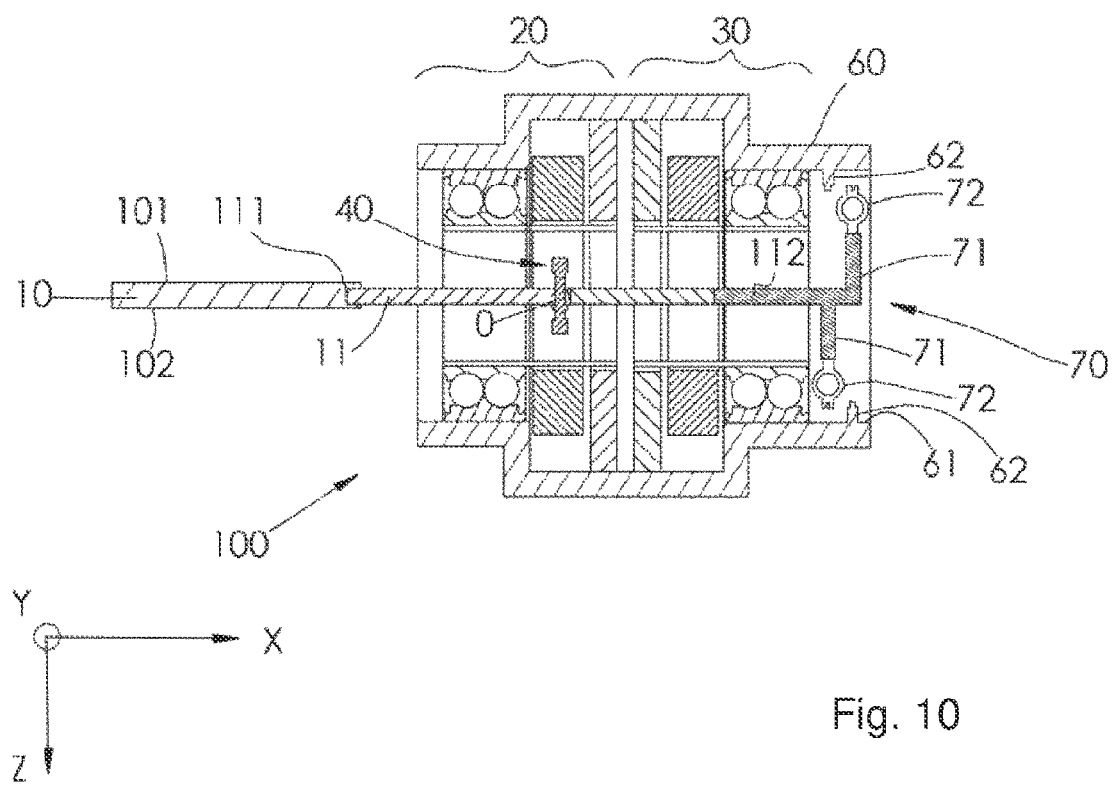

FIG. 10 illustrates the positioning of the mirror 10 and of the anti-rotation device 70 in the initial and operational configuration.

Figure 11:
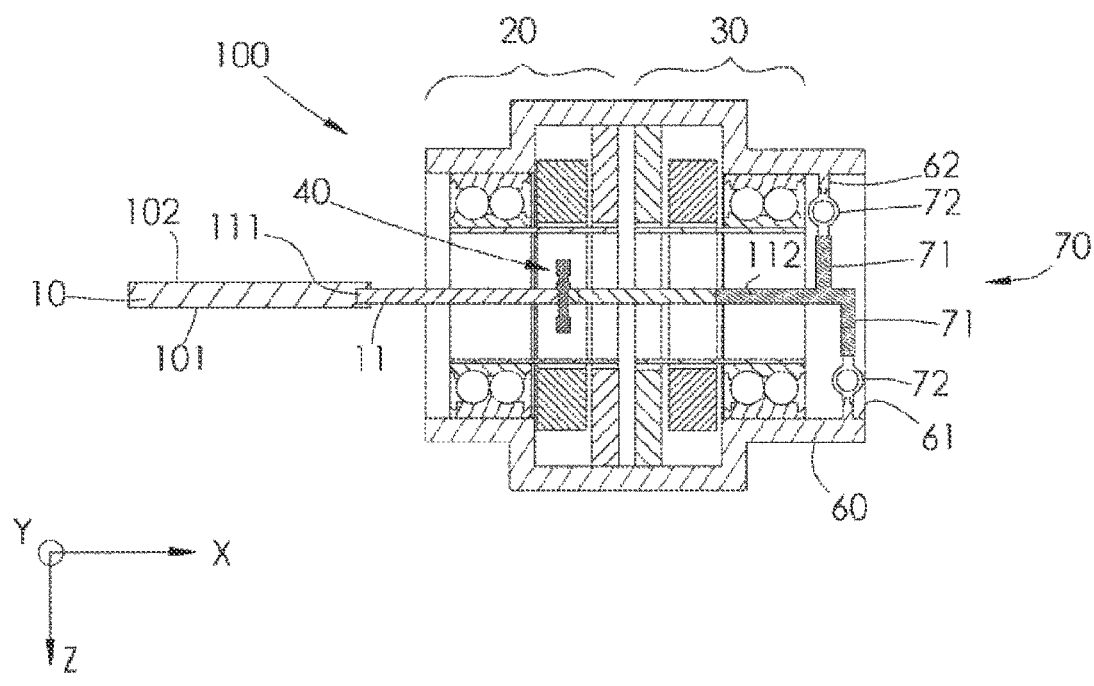

FIG. 11 illustrates the positioning of the mirror 10 and of the anti-rotation device 70 in the blocked and therefore non-operational configuration.

Between the two configurations, the mirror 10 has rotated 180° about the main axis X.

It is understood that the insertion of the anti-rotation device 70 reduces the operational angular range of the sweeping of the mirror about the main axis X. This angular range is preferably less than 360°, even more preferably of the order of 340°.

The anti-rotation device 70 includes:
- a first assembly to avoid sweeping of the mirror 10 about the axis Y' during launch,
- a second assembly to avoid sweeping of the mirror 10 about the main axis X during launch.

The first assembly includes on the one hand two arms 71, each extending radially from the transmission shaft 11 towards the external frame 60. The two arms 71 preferably extend in a diametrically opposite manner. The two arms 71 are offset from each other on the main axis X, that is to say they are not in the same plane YZ.

Each arm 71 ends in a stop.

The first assembly also includes two protrusions 62 disposed on an internal face 61 of the external frame 60.

The external frame 60 is preferably cylindrical in shape at the second end 112 of the transmission shaft 11.

A first protrusion 62 is disposed in the plane YZ containing a first arm 71. A second protrusion 62 is disposed in the plane YZ containing a second arm 71.

The protrusions 62 are preferably diametrically opposite.

The stops 72 and the protrusions 62 are configured in shape and size so that said stops cooperate, with a small clearance, with said protrusions of the external frame 60, when the orientation device 100 is in the blocked configuration.

In an exemplary embodiment, the arms 71 are made of a polymer material, for example polyetheretherketone (PEEK) to ensure their rigidity.

In an exemplary embodiment, the stops 72 are made of an elastomer material, for example Smactane®, to increase damping.

The second assembly includes on the one hand a blade 73, which is preferably flexible, extending radially from one end of the third shaft 31 to the internal face 61 of the external frame 60. The blade 73 is disposed in a plane YZ, distinct from those of the two arms 71.

The second assembly also includes a magnetic element 74, for example a magnet, fixedly disposed on the internal face 61 of the external frame 60.

The blade 73 is dimensioned in length to be able to be pressed against the magnetic element 74.

The blade 73 further includes a ferromagnetic portion 731 at its free end against the magnetic element 74.

The torque generated is high enough to meet the needs of the anti-rotation device 70 and low enough to allow disengagement of said anti-rotation device with the first and second electric motors (no need for an external actuator).

The blade 73 and the magnetic element 74 are positioned in the orientation device 100 such that, when the stops 72 cooperate with the protrusions 62 of the first assembly, the blade 73 bears against the magnetic element 74 and blocks the rotation of the mirror 10.

The magnetic element 74 thus has the dual function of blocking the rotation of the mirror 10 about the main axis X and of preventing the stops 72 from disengaging from the protrusions 62.

In an exemplary embodiment, the blade 73 is made of a flexible material, for example an alloy of copper and beryllium.

FIGS. 12a to 12c illustrate switching the orientation device in the blocked configuration.

When it is desired to place the orientation device 100 in the blocked configuration, for launching, the transmission shaft 11 is subjected to a rotation about the main axis X, driving the mirror 10 on one side and the anti-rotation device 70 on another side, until:
- the stops 72 engage respectively and simultaneously, with little clearance, in their respective protrusions 62 of the external frame 60,
- the blade 73 is pressed simultaneously against the magnetic element 74.

The invention claimed is:

1. A device for orienting a load, with which is associated an orthonormal device reference frame XYZ, with centre 0, the orientation device being intended to orient said load about a longitudinal axis X, called main axis, and a transverse axis Y, called secondary axis, the orientation device including:
   a first shaft, called transmission shaft, intended to support said load, configured to be rotated, at centre 0, about the main axis X and the secondary axis Y,
   a second shaft, configured to be rotated about the main axis X,
   a third shaft configured to be rotated about a third axis of rotation, in the same direction as the main axis X,
   a first connection component between the transmission shaft and the second shaft, configured to prevent relative movements between said transmission shaft and said second shaft in, both a degree of rotational freedom about the main axis and three degrees of translational freedom,
   a second connection component between the transmission shaft and the third shaft and configured to allow relative movements between said transmission shaft and said third shaft in both a degree of translational freedom along the third axis of rotation and three degrees of rotational freedom,
   the second connection component, the transmission shaft and the third shaft forming an eccentric kinematic connection.

2. The orientation device according to claim 1, wherein the second shaft and the third shaft are hollow shafts through which the transmission shaft passes.

3. The orientation device according to claim 1, wherein the first connection component is a set of flexible elements.

4. The orientation device according to claim 1, wherein the second connection component includes a pivot, which is eccentric relative to the third axis of rotation of the third shaft, mounted on a membrane, said pivot being solidly attached to the transmission shaft and said membrane solidly attached to said third shaft.

5. The orientation device according to claim 4, wherein the third axis of rotation of the third shaft is distinct from the main axis X, the pivot of the second connection component being positioned on the main axis.

6. The orientation device according to claim 4, wherein the third axis of rotation of the third shaft coincides with the main axis, the pivot of the second connection component being radially distant from said third axis of rotation.

7. The orientation device according to claim 6, wherein a second orthonormal reference frame X'Y'Z', with centre O, is associated with the second shaft and wherein the orientation device includes an anti-rotation device configured to prevent the load from sweeping about the main axis X and the axis Y', and place the orientation device in a non-operational configuration, called blocked configuration.

8. The orientation device according to claim 7, wherein the anti-rotation device includes a first assembly configured to prevent the mirror from sweeping about the axis Y'.

9. The orientation device according to claim 8, wherein the first assembly includes:

two arms, each extending radially from the transmission shaft towards an external frame of said orientation device, and each ending in a stop, said two arms being disposed in two distinct planes YZ, two protrusions disposed on an internal face of the external frame, one protrusion in each plane YZ containing a radial arm, the stops and protrusions being configured so that said stops cooperate, with a small clearance, with said protrusions of the external frame, when the orientation device is in the blocked configuration.

10. The orientation device according to claim 7, wherein the anti-rotation device includes a second assembly configured to prevent the mirror from sweeping about the main axis X.

11. The orientation device according to claim 10, wherein the second assembly includes:

a flexible blade extending radially from the third shaft towards the external frame, including a ferromagnetic portion at a free end, a magnetic element fixedly disposed on the internal face of the external frame, the blade and the magnetic element being positioned in the orientation device such that, when the stops cooperate with the protrusions of the first assembly, the blade bears against the magnetic element, placing the orientation device in the blocked configuration.

* * * * *